No. 729,396. PATENTED MAY 26, 1903.
G. H. NISSEN.
FEED BAG.
APPLICATION FILED APR. 16, 1902.

NO MODEL.

WITNESSES:
E. H. Boyce
E. S. Newton

INVENTOR
George Herman Nissen
BY
Stephen J. Cox
ATTORNEY

No. 729,396. Patented May 26, 1903.

UNITED STATES PATENT OFFICE.

GEORGE HERMAN NISSEN, OF BROOKLYN, NEW YORK.

FEED-BAG.

SPECIFICATION forming part of Letters Patent No. 729,396, dated May 26, 1903.

Application filed April 16, 1902. Serial No. 103,100. (No model.)

*To all whom it may concern:*

Be it known that I, GEORGE HERMAN NISSEN, a citizen of the United States, and a resident of Brooklyn, in the county of New York, city and State of New York, have invented certain new and useful Improvements in Feed-Bags, of which the following is a specification.

My invention relates to bags or baskets for feeding grain and like food to horses or other animals; and its objects are, among others, to produce an article of this character of simple and durable construction which will automatically supply the feed in proper quantity to the animal while eating without danger of wasting and which may also be used as a receptacle in which the feed may be safely carried.

It consists of the combination of parts and arrangement of details hereinafter described and claimed, and illustrated in the accompanying drawings.

Figure 1:
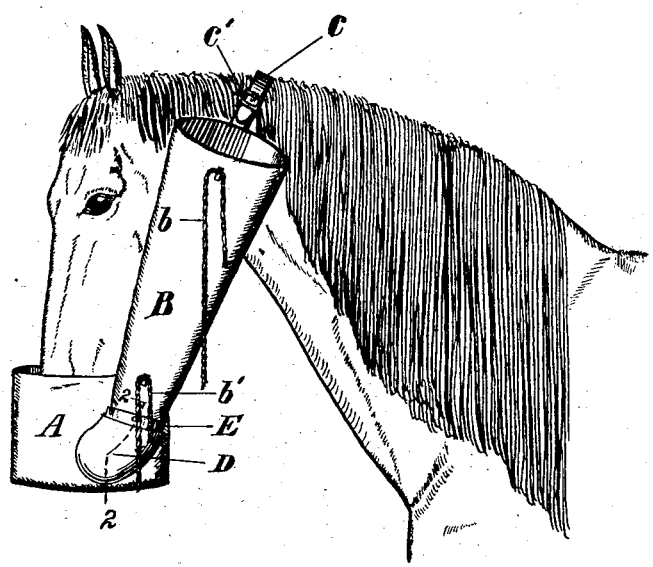
Figure 2:
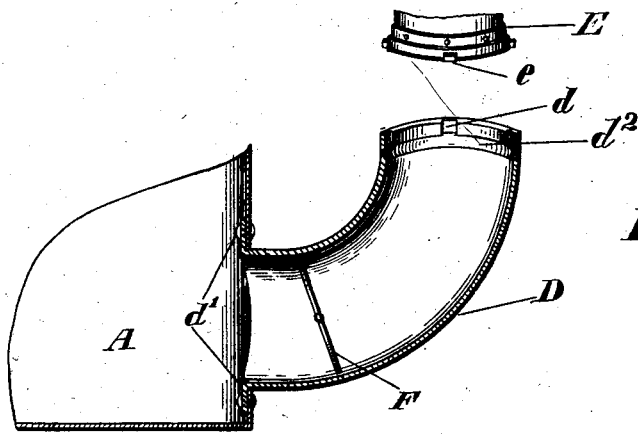

In the said drawings, Figure 1 is a side view of a feed-bag, showing my improvement as it appears while being used for feeding. Fig. 2 is a section of one of the channels or reservoirs on the line 2 2 of Fig. 1.

The basket or main receptacle A is preferably of the ordinary circular form with a flat bottom, but is somewhat shallower than usual to allow the animal to breathe freely. This is possible in my device owing to the fact that only a sufficient amount of feed is supplied to the basket to replenish the same as it is consumed and the level of the said feed maintained at about the top of the gates through which it enters.

The supply-tube B may be made of canvas, leather, or other suitable material, and communicates with the basket through the neck D, preferably made of metal and secured to the said basket by means of the annular flange $d'$, which is riveted or otherwise secured to the same near the bottom. One of these necks may be located on each side. The tubes are detachably secured to the upper ends of the necks by means of the lugs $e$ on the butt E, which pass through the slots $d$ into the annular groove $d^2$ and hold the said parts together when turned slightly, so that the said lugs cannot pass out again through the slots. The tube is provided near the top and bottom with cords or straps $b\ b'$, by which the ends may be closed, so that feed may be carried in it when detached from the basket. The cord $b$ also serves to prevent the feed from being shaken out while the animal is eating, and the cord $b'$ may be used to regulate the flow of feed into the basket, if desired. The upper end of the tube is provided with a strap C, adapted to pass over the neck of the animal and connect through the buckle $C'$ with a like strap secured to the tube on the opposite side or to the opposite side of the basket if only one tube is used. I have also provided a butterfly-valve F in the neck D to restrict the flow of feed. This will be especially useful where very fine grain is used.

It will be seen that as soon as the feed in the bag reaches the level of the top of the inlet it will cease flowing, and this level will be maintained until the reservoir-tubes are emptied or the supply shut off by tying the string $b'$. With the continuous supply of feed provided by my device the animal will not find occasion to shake the bag or basket, and thus spill the contents, and in this manner a very material saving of feed is effected. The tubes also afford a very convenient means for carrying the grain or other food and may be made large enough to carry sufficient food for a number of days' feeding, or, if desired, extra tubes may be carried which may be readily attached to the basket and detached therefrom.

What I claim is—

1. The combination of the basket or bag proper, a neck or connecting-piece fixed to the lower portion thereof, a supply channel or compartment detachably secured to said neck and communicating with the basket therethrough and a valve in said neck adapted to be alternately opened and closed by the feed.

2. The combination of the basket or bag proper, a rigid neck secured to the lower portion thereof, a supply channel or compartment detachably connected to said neck and communicating with the basket or bag therethrough and a normally closed valve in said neck adapted to be opened by the pressure of the feed.

3. The combination of a bag or basket, means for suspending the same from the neck of the animal, a supply-channel detachably connected to said means and to the basket, and means carried by said channel for opening and closing its ends.

4. The combination of a bag, a detachable channel communicating therewith composed of flexible material and extending above the bag, a rigid connecting-piece fixed to said bag and a detachable connection between said connecting-piece and the supply-channel and a valve adapted to be automatically opened and closed by the feed.

5. The combination of a bag, a channel or supply-compartment of flexible material extending above the bag and tapering downwardly, a detachable connection between said supply-compartment and the bag and means for closing the ends of said supply-channel when detached from said bag whereby the same may be used for the purpose of carrying feed.

6. The combination of a bag, a channel or supply-compartment of flexible material extending above the bag, a detachable connection between said supply-compartment and the bag and detachable means for supporting said compartment and means for closing the ends of said supply-channel when detached from said bag.

7. The combination of a bag, a rigid neck fixed thereto, a normally closed valve in said neck, a supply-compartment of flexible material extending above said bag, and a detachable connection between the said supply-compartment and neck, and means for closing the ends of said supply-compartment when detached.

Witness my hand this 2d day of April, 1902, at the city of New York, county and State of New York.

GEORGE HERMAN NISSEN.

Witnesses:
HERMAN MEYER,
ERNEST H. BOYCE.